United States Patent [19]

Plaisted et al.

[11] Patent Number: 5,330,785

[45] Date of Patent: *Jul. 19, 1994

[54] METHOD FOR THE SEALING OF UNSTABLE ROCK STRATA

[76] Inventors: Anthony C. Plaisted, 2032 Blairmore Rd., Lexington, Ky. 40502; Leonard G. Hickam, 531 Maple St., Georgetown, Ky. 40324

[*] Notice: The portion of the term of this patent subsequent to Nov. 24, 2009 has been disclaimed.

[21] Appl. No.: 979,753

[22] Filed: Nov. 23, 1992

Related U.S. Application Data

[63] Continuation-in-part of Ser. No. 804,143, Dec. 6, 1991, Pat. No. 5,165,958, which is a continuation-in-part of Ser. No. 561,761, Aug. 27, 1990, abandoned, which is a continuation-in-part of Ser. No. 420,495, Oct. 12, 1989, abandoned.

[51] Int. Cl.$^5$ ............................................. B05C 1/16
[52] U.S. Cl. ................................. 427/136; 427/397.8; 405/264
[58] Field of Search ............... 427/136, 377, 397.8, 427/393.6; 405/264; 106/38.23

[56] References Cited

U.S. PATENT DOCUMENTS

| | | |
|---|---|---|
| 3,920,460 | 11/1975 | Boston et al. |
| 4,072,019 | 2/1978 | Pearson |
| 4,185,141 | 1/1980 | Krejci et al. |
| 4,240,838 | 12/1980 | Blasko et al. |
| 4,261,670 | 4/1981 | Paban |
| 4,325,658 | 4/1982 | Baker |
| 4,347,285 | 8/1982 | Batdorf |
| 4,380,595 | 4/1983 | Arpin |
| 4,607,066 | 8/1986 | Barry et al. |
| 4,687,790 | 8/1987 | Andreichuk |
| 4,799,549 | 1/1989 | Vinot et al. |
| 5,165,958 | 11/1992 | Plaisted et al. |

*Primary Examiner*—Shrive Beck
*Assistant Examiner*—Diana Dudash

[57] ABSTRACT

A method utilizing non-reactive fillers in the sealing of unstable rock strata under wet or humid conditions, the method comprising providing (a) from about 10 to about 85% by weight of a water soluble alkali metal silicate, (b) about 0.7% to about 10.0% by weight of a water soluble or water miscible reactant for said alkali metal silicate and (c) about 2 to about 50% by weight of non-reactive filler, bringing components (a), (b) and (c) together with sufficient mixing to form a sealing composition, applying the composition in a coating to the rock strata and permitting the composition to set while being exposed to wet or humid conditions to form an impervious sealant coating thereby imparting structural strength and reinforcement and preventing penetration of air and dust through the rock strata. Preferably the non-reactive filler comprises a minor proportion, for example from about 0.2% to about 10% by weight based on the weight of the sealant composition of reinforcing fibers.

14 Claims, No Drawings

METHOD FOR THE SEALING OF UNSTABLE ROCK STRATA

This application is a continuation-in-part based on application Ser. No. 07/804,143 filed Dec. 6, 1991, now U.S. Pat. No. 5,165,958, which was a continuation-in-part based on application Serial No. 07/561,761 filed Aug. 27, 1990, now abandoned, which was a continuation-in-part based on application Ser. No. 07/420,495,now abandoned, filed Oct. 12, 1989.

BACKGROUND OF THE INVENTION

Application Ser. No. 07/804,143 relates to a method utilising non-reactive fillers in an aqueous alkali metal silicate-based curable sealant composition for sealing mine stoppings.

It has now been found that sealant compositions of the type described in Application Ser. No. 07/804,143 may also be used advantageously to seal unstable rock strata. While ready-to-use sealants are known for such general purpose, they are limited by their inability to set in areas of high humidity, or wet conditions where drying cannot take place.

It is known that in underground excavations such as coal mines, seasonal changes in moisture content and air movement can have deleterious effects on the surrounding strata. As a result fragile shale will continuously flake off from the roof and rib, presenting personal hazard in the underground passageways as well as impeding movement due to accumulated debris. Such a condition can progress to the point where major rebolting is necessary to prevent roof collapse.

Additionally as the roof degrades the irregular surface increases resistance to air flow and therefore increases cost of ventilation.

Accordingly elimination of these problems is essential for safe working in the mine and to enable the maintenance of a proper atmosphere affording the least hostile working conditions for miners or workers.

The current method utilized to alleviate this problem involves the use of expensive wire mesh and sprayed concrete.

BRIEF SUMMARY OF INVENTION

The present invention essentially involves a method of sealing unstable rock strata under wet and dry conditions by using an aqueous curable sealant composition comprising:

(1) From about 10 to 85%, preferably from about 50 to 70% by weight of an aqueous solution of alkali metal silicate, such as sodium or potassium metal silicate having a solids content in the range of 10 to 60%.

(2) From about 2 to 50%, preferably about 35 to 40% by weight of at least one non-reactive filler which is so non-reactive that it (they) will not have setting properties in conjunction with the water soluble alkali metal silicate.

(3) From about 0.7% to about 10.0%, preferably about 3.5% to 5% by weight of a water soluble or water miscible reactant for the alkali metal silicate.

It has been found that components (1) and (2) of the aqueous sealant composition can be premixed to provide a ready-to-use composition of extended shelf life of at least six months and as long as one year. The sealant may be sprayed or troweled onto under ground rock strata under wet conditions or high humidity conditions to form an impervious coating which prevents spalling of the strata and imparts structural strength and reinforcement. Such sealants also have successfully prevented air loss through typically porous rock strata. Thus, with a reduced air loss, there is a corresponding improved efficiency of ventilation equipment. Also, the method of the present invention in the course of sealing, also achieves valuable fireproofing.

The sealants used in the method of the present invention may be provided in the form of ready-made mortars. The resultant mortar will begin to harden and gain strength within eight hours under wet mine conditions. Air and moisture resistant properties will develop in about 24 hours.

The compositions used in the present invention are to be contrasted with the prior art ready-made mortar sealants which function by evaporation of water and therefore, need dry conditions before setting hard. With the present invention, the ready-made sealant is capable of setting in a predetermined time in either wet or dry conditions.

OBJECTS OF THE INVENTION

It is therefore an object of the present invention to provide a method utilizing non-reactive fillers in the sealing of unstable rock strata involving the use of an economical sealant.

Yet another object of the present invention is to provide a sealant for use in a method utilizing non-reactive fillers in the sealing of unstable rock strata that will set under wet conditions to form an impervious coating which will prevent spalling of the strata and impart structural strength and reinforcement.

A further object of the present invention is to provide a sealant for use in a method utilizing non-reactive fillers in the sealing of unstable rock strata which is provided as a ready-made formulation that can be readily applied and will set quickly.

Still another object of the present invention is to provide a sealant which is used in a method utilizing non-reactive fillers in the sealing of unstable rock strata, which sealant has a long shelf life.

Yet another object of the present invention is to provide a sealant for use in a method which also achieves fireproofing of the rock strata and the preserved area.

DESCRIPTION OF THE PREFERRED EMBODIMENT

In the composition used in connection with the present invention, an aqueous solution of the alkali metal silicate is provided which may be sodium or potassium silicate and which contains from 10 to 85% by weight, preferably 50 to 70% by weight, of a silicate having a $SiO_2$ to $M_2O$ mole ratio of from 2:1 to about 4:1 (where M represents the alkali metal) and the silicate solution has a solids content in the range of 10 to 60% by weight, preferably about 30 to 40% by weight (the remainder being water), and most preferably 36%.

The fillers used in the sealant should be non-reactive and compatible with the silicate solution for long-term shelf life. Examples of suitable fillers include mica and clay for example kaolin. Preferably the non-reactive filler comprises a minor proportion, for example from about 0.2% to about 10% by weight based on the weight of the sealant composition, of reinforcing fibers such as polypropylene fibers, cellulose fibers or glass fibers. A minor proportion of the non-reactive filler may also be a pigment such as titanium dioxide.

The water soluble or water miscible reactant to initiate gel formation may be any weak acid or acid salt or ester or ester blend that hydrolyzes to release acid. Suitable esters include dialkyl esters of the formula $R_1OOC(CH_2)_n COOR_2$ where in $R_1$ and $R_2$ may be the same or different alkyl carbon atoms of from 1 to 20 preferably 1 to 6 and n is 2, 3 or 4, such as dimethyl succinate, dimethyl glutarate or dimethyl adipate or blends thereof, glycol esters such as ethylene glycol diacetate or propylene glycol dicetate and glycerol esters such as diacetin or triacetin.

In order to aid dispersion of the ester in the sealant composition the composition may also contain a polyhydric alcohol, such as glycerol, ethylene glycol or propylene glycol with which the ester is predissolved in water, or an emulsifier which is premixed with the ester and water to produce an emulsion.

As will be seen from the gel times in the detailed example set forth hereinbelow, the method of the present invention involves a composition with a gel time generally in the vicinity of at least 15 minutes and closer to 30 minutes. This is sufficient to enable hoses through which the composition is transported to be cleaned after the spraying operations and before the residual material remaining in the hoses tends to harden.

EXAMPLE I

| | PARTS BY WEIGHT |
|---|---|
| PART "A" | |
| Sodium Silicate Solution (SiO$_2$/Na$_2$O = 3.22) | 66 (36% solids) |
| Water | 23 |
| Kaolin | 4 |
| Cellulose Fiber | 5 |
| Titanium Dioxide | 1 |
| Mica | 1 |
| PART "B" | |
| Water | 37 |
| Tergitol XH (Nonionic surfactant) | 1 |
| Triacetin | 62 |

(a) Blending Part "A" with Part "B" at a volume ratio of 20:1 results in a gel time of 30 minutes at 70° F.
(b) Blending Part "A" with Part "B" at a volume ratio of 10:1 results in a gel time of 17 minutes at 70° F.

The kaolin in the above formula is a filler that adds consistency, trowelability and thixotropy (false body) to the final product.

Part A of the above-noted example also includes cellulose fiber which is another filler. There is also a minor amount of titanium dioxide that acts as a colouring agent so that the set coating on the rock strata has some reflectant properties.

The final component in Part A is mica which is a good film former and adds trowelability and thixotropy to the Part A mix.

In the Part B mix, the Tergitol XH is a true emulsifier for the triacetin or other reactant material so that it readily blends with the water.

Each of the Parts A and B are prepared separately by simply adding the various ingredients to a mixing vessel and mixing at room temperature. Sodium silicate is readily soluble in the water and then the other components of Part A are added in the order shown in the above example, with sufficient mixing.

To the same effect is Part B wherein the Tergitol XH is added to the water and then the triacetin is added, with the Tergitol XH acting as an emulsifier.

In use, the Part A and Part B components are brought together in a volume ratio of 20 Parts A to 1 Part B. On a weight basis, this is 26 parts by weight of Part A to 1 part of Part B. After adequate mixing in a tank, the slurry (which is reasonably pumpable, is forced through hoses and through a spray head onto the rock surfaces in order to provide a continuous coating. This coating sets in 30 minutes where the weight ratio of Part A to Part B is 26:1 and the temperature is 70° F.

In a second blend, the ratio of Part A to Part B on a volume basis is 10:1 or 13:1 parts by weight. The setting time for blend 2 is 17 minutes. There is also a blend 3 where the ratio of Part B is 17:1 on a volume basis and 22:1 on a weight basis. The set time is 23 minutes at 70° F. In the event the temperature is lowered, the set time will be longer.

The fillers used in the sealant should be non-reactive and compatible with the water soluble silicate for long term shelf-life.

EXAMPLE II

Preferred Embodiment

In another embodiment of the invention Part "A" and Part "B" of the above Example I were formulated as follows:

| | PARTS BY WEIGHT |
|---|---|
| PART "A" | |
| Sodium Silicate Solution (SiO$_2$/Na$_2$O = 3.22) | 56 (36% solids) |
| Water | 6 |
| Kaolin Clay | 37.5 |
| Alkali Resistant (AR) Glass Fiber | 0.5 |
| PART "B" - PURE SOLUTION | |
| Triacetin | 90 |
| Propylene Glycol | 10 |

It is contemplated that Part B of Example II can be used with Part A of Example I and vice versa.

(a) Blending Part "A" with Part "B" at a volume ratio of 20:1 results in a gel time of 22 minutes at 70° F.
(b) Blending Part "A" with Part "B" at a volume ratio of 10:1 results in a gel time of 20 minutes at 70° F.

In the Part B of this example, there is no emulsifier; it being replaced by propylene glycol. Thus, there is a true solution. This is the preferred formulation. This formulation has long shelf life and stability, and added thixotropic properties in the mixed product.

The sealant according to EXAMPLE I was used at Beech Fork Processing Mine, Prestonsburg, Ky., to coat the roof of the mine in the Dorathy Coal seam. The purpose was to prevent deterioration of the mine roof due to moisture condensation carried in the ventilation air supply. This coating provided sufficient protection over a twelve month period.

The sealant according to EXAMPLE I was applied at Shell Mining, Eastern Mingo Mine, Naugatuck, W. Va. to prevent ventilation air escaping through a fractured coal rib. This coating was still functioning six months after application.

Sealants according to EXAMPLE I and II were successfully applied at two CONSOL Moundsville, W. Va. mines to prevent weathering of roof and rib areas surrounding belt lines carrying coal to the surface.

Sealant according to EXAMPLE I was applied to rock surrounding an underground storage bunker at Southern Ohio Coal Company. This coating was inspected two years after application.

The sealant according to EXAMPLE II was applied to the coal roof and rib at the CONSOL Shoemaker Mine, Moundsville, W. Va. to aid in ventilation and to prevent spalling of coal. Application proved very successful over the 15 month period since application.

Application of sealant of EXAMPLE I was successfully used at Southern Ohio's Saginaw Mine by spray application to the roof and rib to seal off dangerous methane gas from entering the mine.

We claim:

1. A method of sealing rock strata utilizing non-reactive fillers, said method comprising:
   providing an aqueous curable sealant composition having a stable shelf life, said composition having first and second components,
   said first component comprising on a total weight basis:
   (a) from about 10 to 85% by weight of alkali metal silicate solution; and
   (b) from about 2 to about 50% by weight of at least one
   non-reactive filler,
   said second component comprising a solution on a total weight basis of from about 0.7% to about 10.0% of a water soluble for said alkali metal silicate,
   said method comprising mixing said first and second components together to form a sealing composition, applying said composition in a surface coating to said rock strata and said composition setting in a chemical reaction to initiate gel formation, said chemical reaction involving said alkali metal silicate and said water soluble reactant, to form an impervious sealant coating imparting structural strength and reinforcement and also preventing penetration of air and dust through said rock strata.

2. The method of claim 1 wherein said alkali metal silicate is sodium silicate.

3. The method of claim 2 wherein said sodium silicate has a $SiO_2$ to $M_2O$ mole ratio of from 2:1 to about 4:1 (wherein M represents the alkali metal).

4. The method of claim 1 wherein said reactant is one or more esters selected from the group consisting of dialkyl esters of the formula $R_1OOC(CH_2)_n COOR_2$ wherein $R_1$ and $R_2$ are alkyl carbon atoms of 1 to 20, preferably 1 to 6 and n is 2, 3 or 4, and blends thereof, glycol esters and glycerol esters.

5. The method of claim 4 wherein the ester is dimethyl succinate, dimethyl glutarate, dimethyl adipate, ethylene glycol diacetate, propylene glycol diacetate, diacetin or triacetin.

6. The method of claim 5 wherein the sealant composition also contains an emulsifier.

7. The method of claim 1 wherein the filler is kaolin clay.

8. The method of claim 1 wherein the filler is mica.

9. The method of claim 1 wherein a minor proportion of the filler comprises fibers.

10. The method of claim 9 wherein the fibers are selected from the group consisting of polypropylene fibers, cellulose fibers and glass fibers.

11. The method of claim 9 wherein the composition comprises from about 0.2% to about 10% by weight of said fibers.

12. The method of claim 1 wherein a minor proportion of the filler is titanium dioxide.

13. The method of claim 1 wherein the composition comprises from about 35% to about 40% by weight of the filler.

14. The method of claim 1 wherein the composition comprises from about 3.5% to about 5% by weight of the reactant.

* * * * *